United States Patent
Kong et al.

(10) Patent No.: US 12,314,651 B1
(45) Date of Patent: May 27, 2025

(54) ZIGZAG DETECTION AND HANDLING FOR INTEGRATED CIRCUIT DESIGN

(71) Applicant: Cadence Design Systems, Inc., San Jose, CA (US)

(72) Inventors: Hongxin Kong, College Station, TX (US); Wing-Kai Chow, Austin, TX (US); Mehmet Can Yildiz, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 609 days.

(21) Appl. No.: 17/831,328

(22) Filed: Jun. 2, 2022

(51) Int. Cl.
*G06F 30/30* (2020.01)
*G06F 30/392* (2020.01)
*G06F 30/394* (2020.01)
*G06F 111/04* (2020.01)
*G06F 119/12* (2020.01)

(52) U.S. Cl.
CPC .......... *G06F 30/394* (2020.01); *G06F 30/392* (2020.01); *G06F 2111/04* (2020.01); *G06F 2119/12* (2020.01)

(58) Field of Classification Search
CPC .. G06F 30/394; G06F 30/392; G06F 2111/04; G06F 2119/12
See application file for complete search history.

(56) References Cited

U.S. PATENT DOCUMENTS

| | | | | |
|---|---|---|---|---|
| 6,389,376 B1 * | 5/2002 | Lam | ...................... | G06F 30/394 703/2 |
| 8,464,196 B1 * | 6/2013 | Lawson | ................ | G06F 30/394 716/129 |
| 12,216,977 B1 * | 2/2025 | Chow | ................... | G06F 30/398 |

* cited by examiner

*Primary Examiner* — Jack Chiang
*Assistant Examiner* — Brandon Bowers
(74) *Attorney, Agent, or Firm* — Schwegman Lundberg & Woessner, P.A.

(57) ABSTRACT

Aspects of the present disclosure address systems and methods for zigzag detection and handling for integrated circuit designs. Data describing an integrated circuit is accessed. The integrated circuit design comprises a connection path between two or more pins of a net determined based on an initial routing of the net. A zigzag is detected in the connection path based on a local turn density constraint that specifies a ratio of a number of turns to a pathlength that corresponds to zigzagging in the net. In response to detecting the zigzag in the connection path, the zigzag is removed from the connection path by rerouting the net using a routing constraint that defines a maximum number of turns in the connection path.

20 Claims, 6 Drawing Sheets

ZIGZAG DETECTION AND HANDLING FOR INTEGRATED CIRCUIT DESIGN

TECHNICAL FIELD

The present disclosure generally relates to the technical field of integrated circuit (IC) design. In particular, the present disclosure addresses systems and methods for zigzag detection and handling.

BACKGROUND

An integrated circuit (IC) comprises cells of similar and/or various sizes, and connections between or among the cells. A cell includes several pins interconnected by wires to pins of one or more other cells. A design netlist describes the logical connectivity between cells in an IC design. A netlist can include a set of nets and each net includes two or more interconnected pins in the IC design.

Design engineers design ICs by transforming circuit descriptions of the ICs into geometric descriptions, called layouts. To create layouts, design engineers typically use electronic design automation (EDA) applications. These applications provide sets of computer-based tools for creating, editing, and analyzing IC design layouts.

EDA applications create layouts by using geometric shapes that represent different materials and devices on IC's. For instance, EDA tools commonly use rectilinear lines to represent the wire segments that interconnect the IC components. These tools also represent electronic and circuit IC components as geometric objects with varying shapes and sizes.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnections between or among the circuit components by determining precise connection paths for each net; and (5) verification, which checks the layout to ensure that it meets design and functional requirements.

Routing is a key operation in the physical IC design cycle. Generally, routing includes determining a connection path between two or more pins in an IC design. The connection path includes only horizontal and vertical lines. In determining a connection path between two or more pins, routing blockages and congestion are avoided using turns. As used herein, a "turn" in a connection path corresponds to a transition from a vertical line to a horizontal line or visa versa. In some instances, avoiding blockages and/or congestion results in a series of consecutive turns in the path, which are referred to as a "zigzag." Each turn requires the connection path to transition a different layer of the design. A via is used to connect portions of the path in different layers. Vias have a high resistance and increase signal delay in the path. Hence, zigzags in a connection path degrade overall circuit performance.

Conventional approaches to zigzag detection involve computing a turn density based on the number of turns in a connection path and the entire length of the path. If the determined turn density exceeds a pre-defined threshold, the net is identified as a zigzagging net. However, if the length of the entire connection path is long, the turn density computed for the net will be low, and possible zigzags in the connection path will be missed and maintained in the design.

Aspects of the present disclosure address problems with conventional approaches to routing that lead to zigzags with an integrated circuit (IC) design process that includes an improved approach to zigzag detection and handling. This approach utilizes a minimum turn threshold that specifies a number of turns for a portion of a connection path in a net of the IC design to be considered a zigzagging portion (a portion of the connection path that includes a zigzag). Consistent with some embodiments, a method corresponding to this improved approach includes identifying portions of a connection path between two or more pins of a net based on the minimum turn constraint, and analyzing the identified portions to detect whether a zigzag is included based on a comparison of a local turn density to a turn density constraint. The turn density constraint specifies a turn density threshold that is used to determine whether a portion of the connection path is a zigzag. In this context, "local turn density" corresponds to a ratio of a number of turns in a portion of a connection path to a length of the portion of the connection path (also referred to as "pathlength"). Hence, the turn density constraint specifies a minimum ratio of the number of turns to pathlength for a portion of the connection path to be considered a zigzag. That is, portions of the connection path that have a local turn density that exceed the turn density threshold are identified as zigzagging portions, while portions of the connection path that do not exceed the turn density threshold are identified as non-zigzagging portions.

In response to detecting one or more zigzags in a net, the method further includes rerouting the net to remove the one or more zigzags. In particular, a routing engine is provided with a routing constraint that limits the number of turns for the net, and the routing engine reroutes the net in accordance with the routing constraint. The routing constraint specifies a maximum number of turns for the net determined based on the minimum turn constraint, the number of zigzagging portions in a net, and a number of non-zigzagging turns in the net.

This approach to zigzag detection and handling significantly improves the accuracy of zigzag detection compared with conventional approaches. Further, by rerouting the net in accordance with the constraint on the number of turns, this approach results in most, if not all, zigzags being removed from routing.

Figure 1:
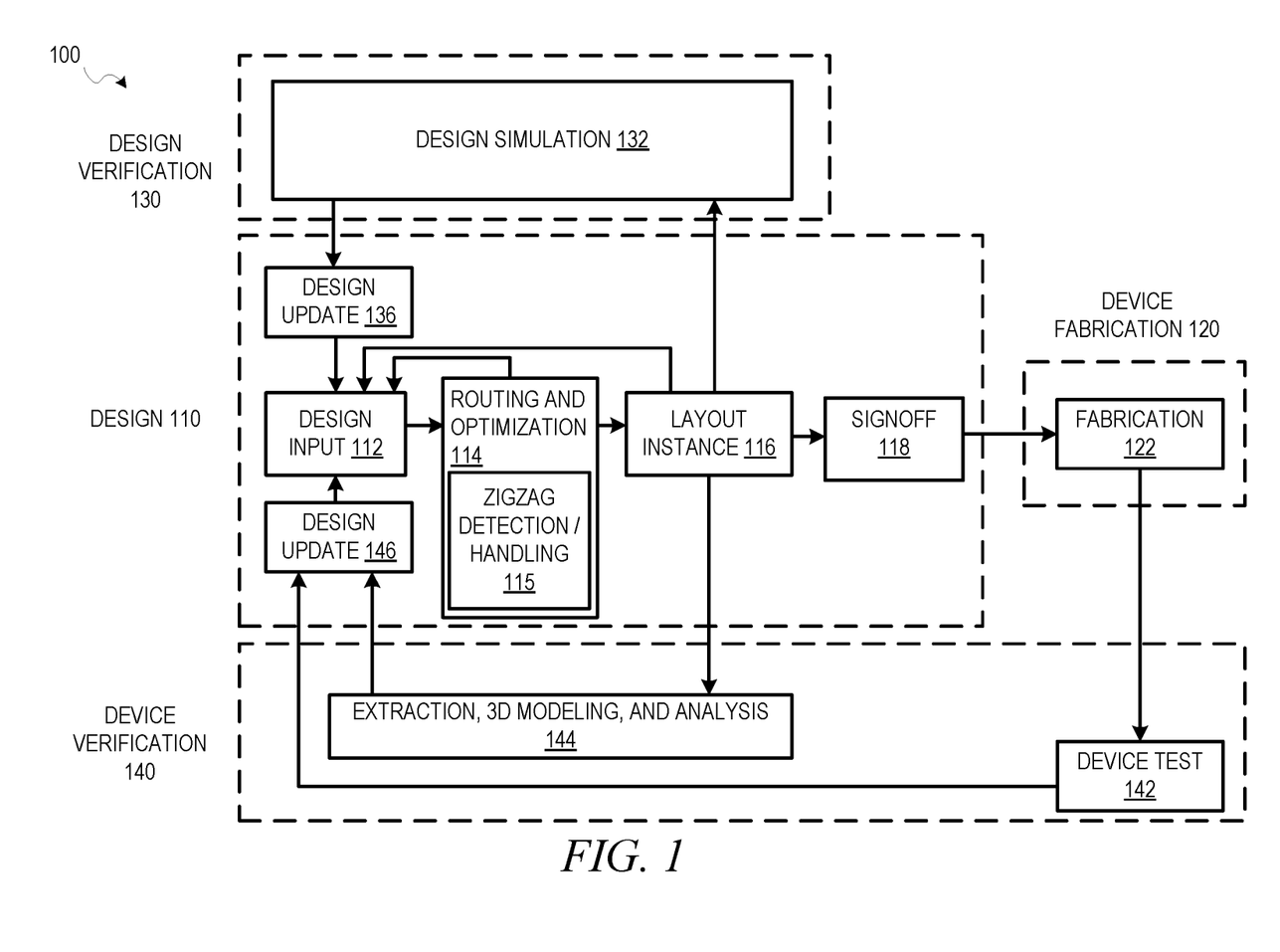
FIG. 1 is a diagram illustrating an example design process flow that includes zigzag detection and handling for initial routing solutions, according to some embodiments.

FIG. 1 is a diagram illustrating an example design process flow 100 that includes clock tree wirelength reduction based on target offsets in connected routes, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. While the design process flow 100 shows the routing and optimization 114 operation occurring prior to a layout instance 116, routing, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the routing and optimization 114 operation includes a zigzag detection and handling operation 115, which may be performed in accordance with various embodiments described herein. The operation 115 can analyze routed nets to detect zigzags in connection paths and reroute nets in which zigzags are detected to remove the zigzag. The operation 115 takes a minimum turn constraint and turn density constraint as inputs. The minimum turn constraint specifies a minimum number of turns for a portion of a connection path in a net of the IC design to be considered a zigzagging portion. As part of the operation 115, portions of a connection path are identified based on the minimum turn constraint, and the identified portions are analyzed to determine whether the portion is a zigzag based on the turn density constraint. The turn density constraint specifies a turn density threshold that is used to determine whether a portion of the connection path is a zigzag. As noted above, turn density corresponds to a ratio of a number of turns in a portion of a connection path to the pathlength of the portion. Portions of the connection path that have a local turn density that exceed the turn density threshold are identified as zigzagging portions, while portions of the connection path that do not exceed the turn density threshold are identified as non-zigzagging portions. To remove a zigzag, a routing engine is provided with a routing constraint that limits the number turns, and the routing engine reroutes the net in accordance with the routing constraint.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations and layout modifications generated based on actual device performance.

A design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
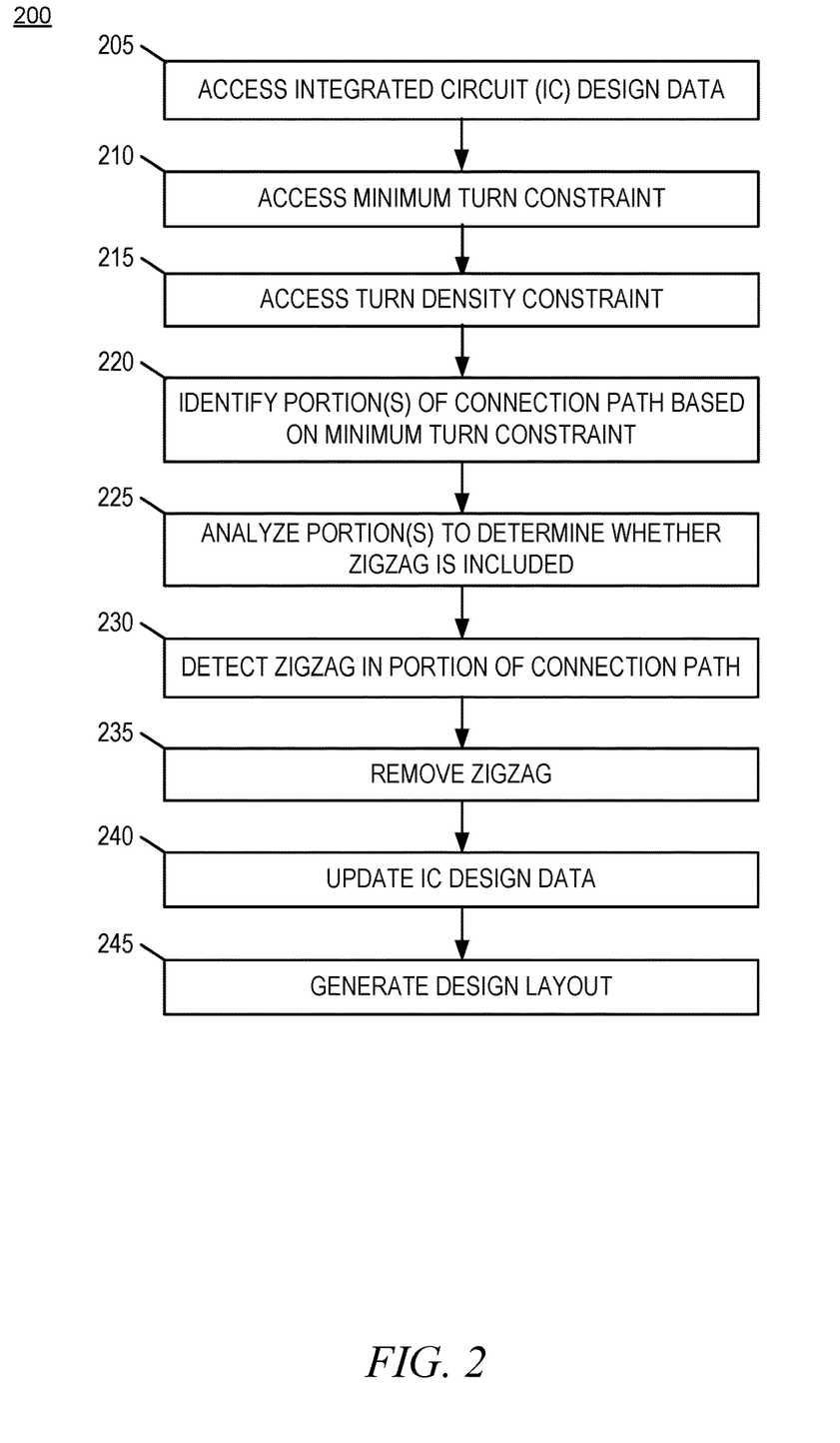
FIGS. 2-4 are flowcharts illustrating operations of a method for zigzag detection and handling for initial routing solutions in an IC design process flow, according to some example embodiments.
Figure 3:
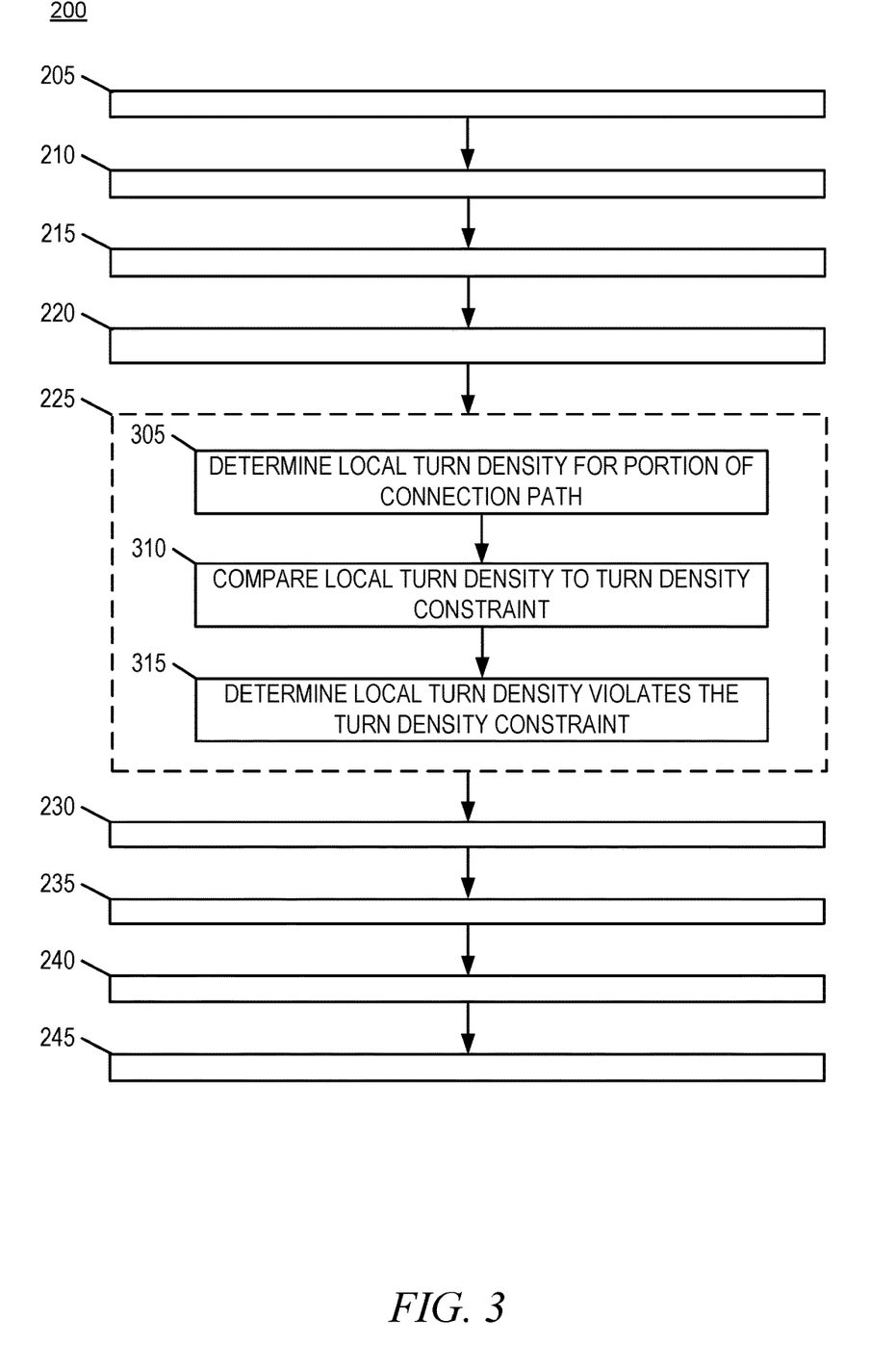
Figure 4:
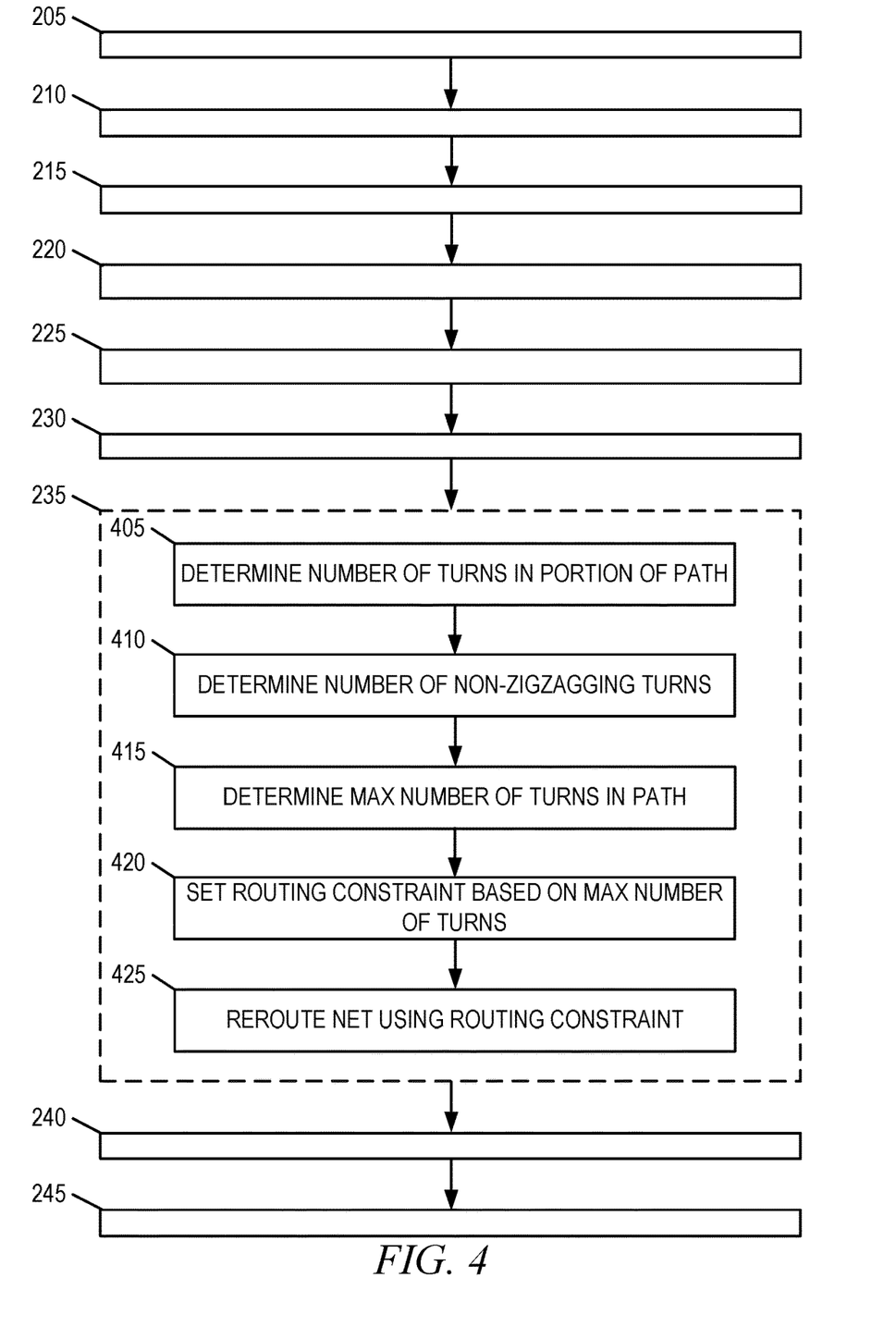

FIGS. 2-4 are flowcharts illustrating operations of a method for zigzag detection and handling for initial routing solutions in an IC design process flow, according to some example embodiments. For some embodiments, the method 200 is performed as part of a routing process applied to a circuit design (e.g., by an EDA software system).

It will be understood that the method 200 may be performed by a device, such as a computing device executing instructions of an EDA software system. For instance, the operations of the method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below with reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

The method 200 as illustrated begins at operation 205 where the computing device accesses data describing an integrated circuit (IC) design (also referred to herein as "IC design data") from memory. The IC design data can comprise or correspond to one or more IC design files stored in memory. The IC design data includes a connection path that connects two or more pins in a net in the IC design. The net may be included among a set of nets specified by a netlist in the IC design. The connection path is determined based on an initial routing process performed for the IC design. That is, the connection path forms part of an initial routing solution for the net in the IC design.

At operation 210, the computing device accesses a minimum turn constraint. The minimum turn constraint specifies a minimum number of turns for a portion of a connection path in the IC design to be considered a zigzagging portion (also referred to simply as a "zigzag"). For some embodiments, the minimum turn constraint can be received from a user via a user interface provided by the computing device. For some embodiments, the minimum turn constraint can be a default value. The computing device can access the minimum turn constraint from the IC design data or another location in memory.

The computing device accesses a turn density constraint at operation 215. The turn density constraint specifies a turn density threshold that is used to determine whether a portion of the connection path is a zigzag. As previously noted, local turn density corresponds to a ratio of a number of turns in a portion of a connection path to a length of the portion of the connection path. Accordingly, the turn density constraint specifies a minimum ratio of the number of turns to pathlength for a portion of the connection path to be considered a zigzag. That is, portions of the connection path that have a local turn density that exceed the turn density threshold are identified as zigzagging portions, while portions of the connection path that do not exceed the turn density threshold are identified as non-zigzagging portions, as will be discussed below.

For some embodiments, the turn density constraint can be received from a user via a user interface provided by the computing device. For some embodiments, the turn density constraint can be a default value. The computing device can access the turn density constraint from the IC design data or another location in memory.

At operation 220, the computing device identifies one or more portions of the connection path that comprise the number of turns specified by the minimum turn constraint. The computing device analyzes each of the one or more identified portions to determine whether a zigzag is included, at operation 225. That is, the computing device determines whether each identified portion is a zigzagging portion or non-zigzagging portion. As will be discussed below, for a given portion of the connection path, the computing device determines whether the portion is a zigzagging portion or non-zigzagging portion based on a comparison of a local turn density of the portion to the local turn density constraint.

The computing device, at operation 230, detects a zigzag in the connection path based on the analysis of the portions of the connection path that include the number of turns specified by the minimum turn constraint. In other words, the computing device determines a portion of the connection path is a zigzagging portion. In response to detecting the zigzag in the connection path, the computing device removes the zigzag from the connection path by rerouting the net using a routing constraint that defines a maximum number of turns in the connection path, at operation 235. The rerouting of the net results in replacing zigzagging portions of the connection path with non-zigzagging portions. As will be discussed in further detail below, the computing device determines the routing constraint based on the number of turns specified by the minimum turn constraint.

At operation 240, the computing device updates the IC design data based on the rerouting of the net. In updating the IC design data, the computing device replaces the initial routing solution with an updated routing solution based on the rerouting. The computing device, at operation 245, generates a design layout instance for the IC device design based the rerouting of the net. The layout describes the physical layout dimensions of the IC device.

As shown in FIG. 3, the method 200 may, in some embodiments, further include operations 305, 310, and 315. For some embodiments, the operations 305, 310, and 315 are performed as part of operation 225 where the computing device analyzes one or more portions of the connection path to identify zigzags.

At operation 305, the computing device determines a local turn density for the portion of the connection path. As noted above, the local turn density comprises a ratio of a number of turns in a portion of the connection path to a pathlength of the portion. In determining the local turn density for the portion of the connection path, the computing device identifies turn locations in the portion of the connection path. The computing device can identify the turn locations based on stored information, which can be included in the IC design data accessed at operation 205. A turn location in the connection path can be represented as a set of coordinates (x, y). Based on the turn locations, the computing device determines a distance between each two consecutive turns in the portion of the connection path, at operation 307. The computing device determines the pathlength of the portion of the connection path based on an aggregate of the determined distances between turns. The computing device divides the pathlength of the portion of the connection path by the number of turns specified by the minimum turn constraint, the result of which corresponds to the local turn density.

The computing device, at operation 310, compares the local turn density to the turn density constraint. In comparing the local turn density to the turn density constraint, the computing device determines whether the local turn density violates the turn density constraint by exceeding the turn density threshold.

At operation 315, the computing device determines the local turn density of the portion of the connection path violates the turn density constraint thereby indicating the portion is a zigzagging portion. That is, the computing device determines the local turn density exceeds the turn density threshold, which provides the basis for the computing device detecting the zigzag in the connection path at operation 230.

As shown in FIG. 4, the method 200 may, in some embodiments, further include operations 405, 410, 415, 420, and 425. For some embodiments, the operations 405, 410, 415, 420, and 425 are performed as part of operation 235 where the computing device removes the zigzag from the connection path. At operation 405, the computing device determines a number of zigzagging portions in the net. The number of zigzagging portions in the net is determined based on the analyzing of the portions of the connection path that include the number of turns specified by the minimum turn constraint.

The computing device determines a number of non-zigzagging turns in the net, at operation 410. A non-zigzagging turn refers to a turn in the connection path that is not included in a zigzagging portion.

At operation 415, the computing devices determines a maximum number of turns in the connection path based on a combination of the number of zigzagging portions, the number of non-zigzagging turns, and the minimum turn constraint. For example, if the number of turns specified by the minimum turn constraint is N, the computing device can compute the maximum number of turns as follows: ((N−1) *#of Zigzagging Portions)+#of non-zigzagging turns.

The computing device, at operation 420, sets the routing constraint based on the maximum number of turns. Using the routing constraint, the computing device performs rerouting of the net at operation 425. The computing device can include or use a routing engine supplied with the routing constraint to perform the rerouting of the net. As a result of rerouting using the routing constraint, an updated routing solution is generated in which the number of turns for an updated connection path for the net does not exceed the maximum number of turns.

Figure 5A:
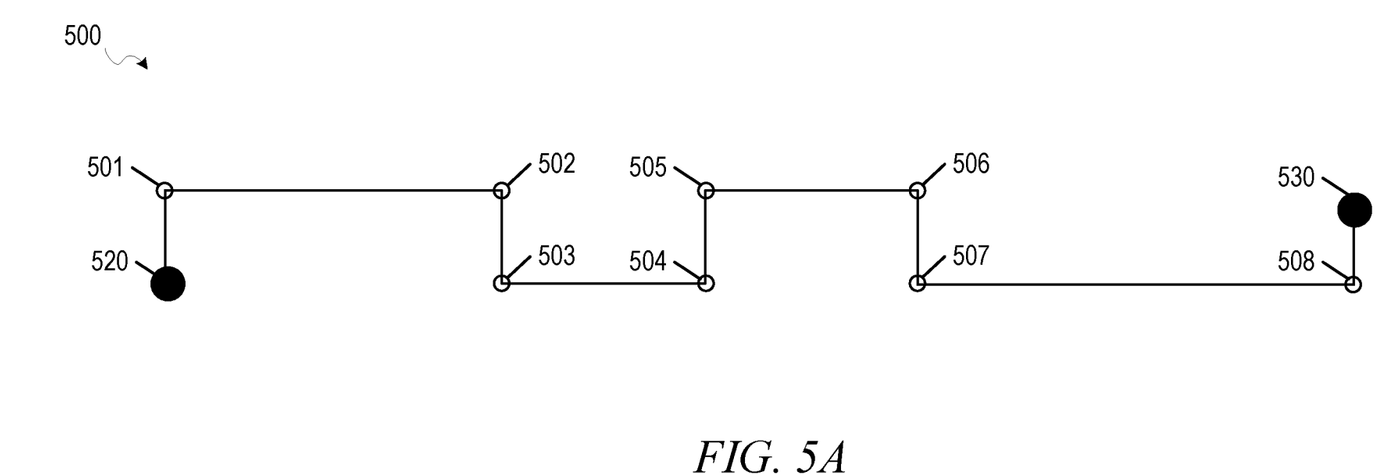
FIGS. 5A and 5B are conceptual diagrams illustrating a process for zigzag detection and handling for initial routing solutions in an IC design process flow, according to some example embodiments.
Figure 5B:
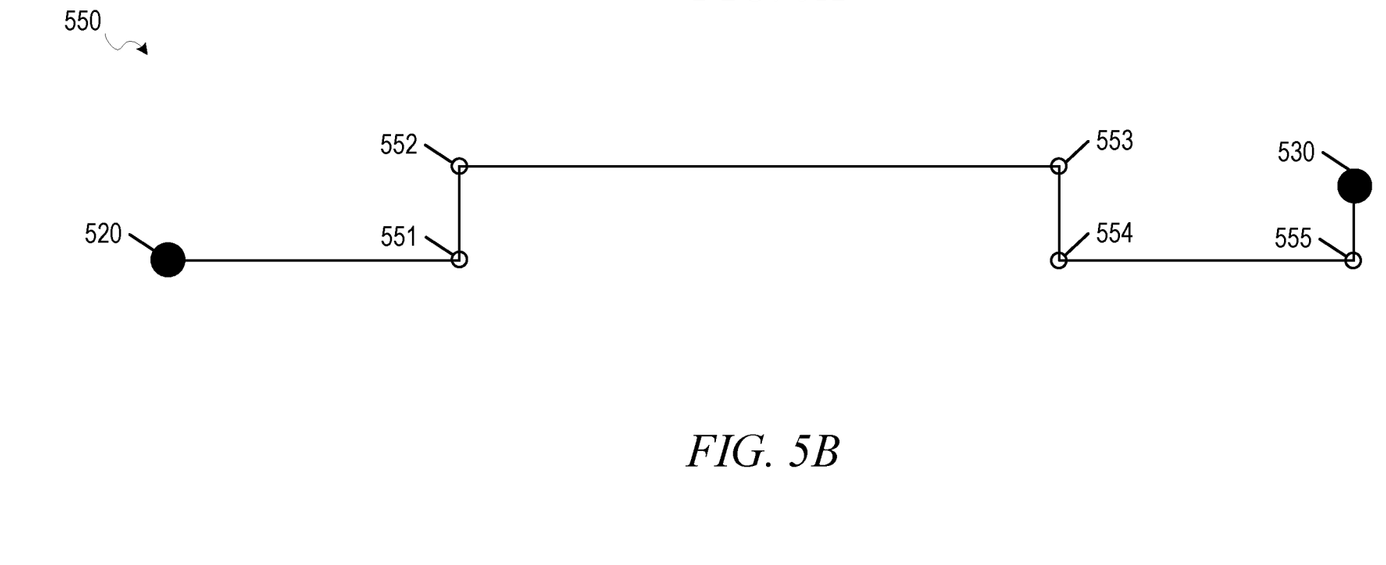

FIGS. 5A and 5B provide an example of the performance of the method 200 with reference to a connection path 500 between a pin 520 and pin 530 of a net of an IC design. As shown, the connection path 500 includes turns 501-508. In this example, the minimum turn constraint is 3. Accordingly, the computing device identifies each portion of the connection path 500 that includes 3 turns and analyzes these portions to determine whether a zigzag is included. In particular, the computing device identifies and analyzes: a first portion comprising turns 501-503; a second portion comprising turns 502-504; a third portion comprising turns 503-505; a fourth portion comprising turns 504-506; a sixth portion comprising turns 505-507; and a seventh portion comprising turns 506-508.

In analyzing each identified portion, the computing device determines a local turn density for each portion and compares the local turn density to a turn density threshold to determine whether the portion is a zigzagging portion. As discussed above, the computing device determines a local turn density based on the number of turns in the portion and a pathlength of the portion. As an example, assume: the location of turn 501 is $(x_1, y_1)$, the location of turn 502 is $(x_2, y_2)$, and the location of turn 503 is $(x_3, y_3)$. In this example, the computing device calculates the pathlength of the first portion as follows: $|x_2-x_1|+|y_3-y_2|$. Given there are 3 turns in the first portion of the connection path 500, the computing device determines the local turn density as follows:

$$\frac{|x2 - x1| + |y3 - y2|}{3}$$

The computing device compares the local turn density of the first portion to a turn density threshold, and if the local turn density exceeds the turn density threshold, the computing device determines the portion is a zigzag. If the local turn density of the portion does not exceed the threshold, the computing device determines the first portion is non-zigging and the computing device may proceed with analyzing the next identified portion (i.e., the next consecutive 3 turns) in the connection path 500 in the same manner as discussed above for the first portion.

Assuming one or more zigzags are detected in the connection path 500, the computing device reroutes the net to remove zigzagging portions. As discussed above, in rerouting the net, the computing device sets a routing constraint that specifies a maximum number of turns for the net. The computing device determines the maximum number of turns for the net based on the minimum turn constraint, the number of zigzagging portions in the connection path 500, and the number of non-zigzagging turns. In particular, the computing device can determine the maximum number of turns as follows:

(N−1)×(#ZIGZAGGING PORTIONS)+(#NON-ZIG-ZAG TURNS)

Here, assume the computing device identifies two zigzagging portions (e.g., a first portion including turns 501-503 and a second portion including turns 504-507) and a single non-zigzagging turn (e.g., turn 508). Given the minimum turn constraint specifies 3 turns, the computing device determines the maximum number of turns for the net is 5 ((3−1)*2+1)=5). Accordingly, the computing device reroutes the net using a routing constraint that limits the number of turns for the net to 5, a result of which is shown in FIG. 5B. As shown in FIG. 5B, an updated connection path 550 connects pin 520 and 530. In accordance with the routing constraint, the connection path 550 includes 5 turns-turns 551-555.

Figure 6:
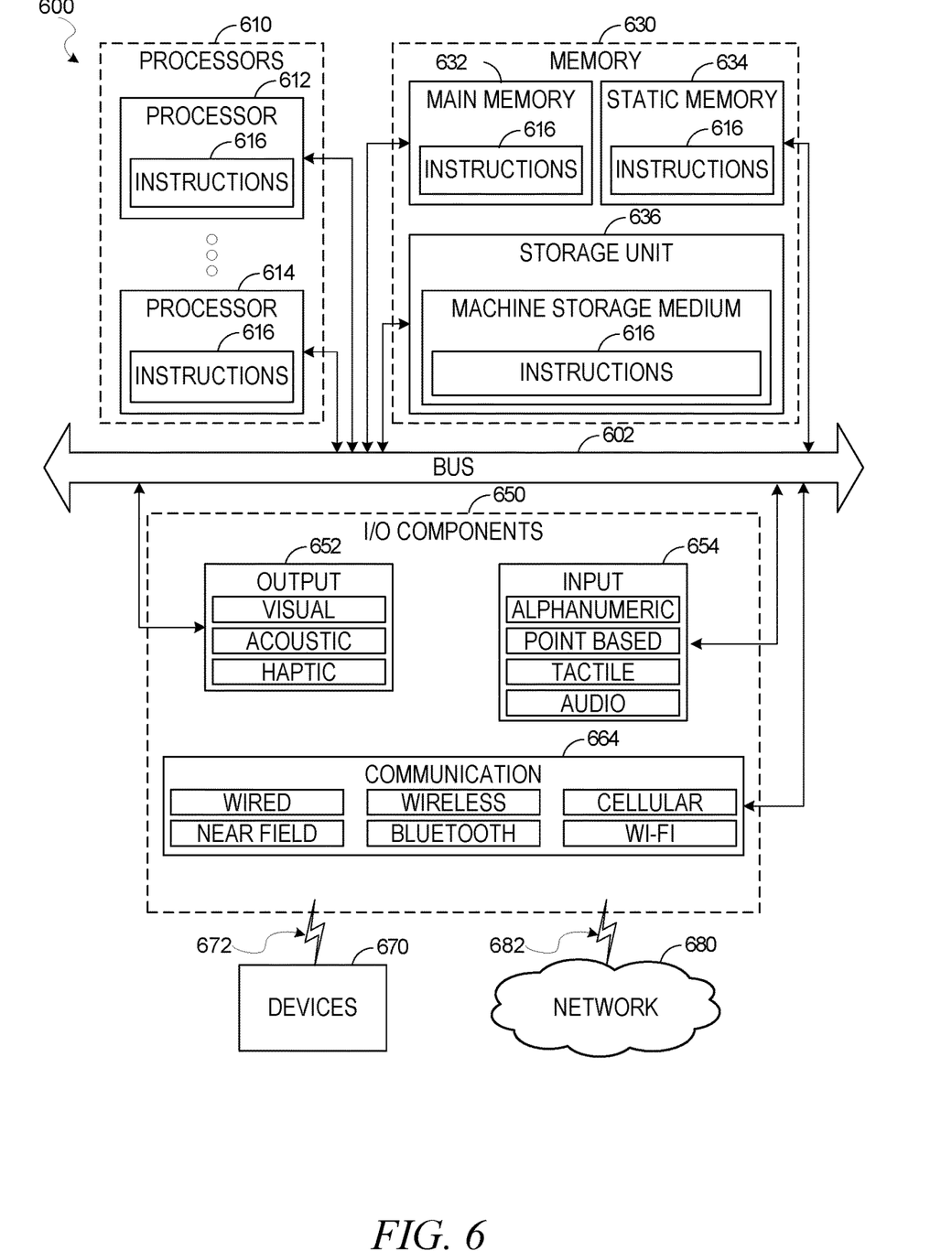
FIG. 6 is a diagrammatic representation of a machine in the example form of a computer system within which a set of instructions for causing the machine to perform any one or more of the methodologies discussed herein may be stored and executed.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute an EDA software system that executes the method 200. Additionally, or alternatively, the instructions 616 may implement the design process flow 100 of FIG. 1. The instructions 616 transform the general, non-programmed machine 600 into a particular machine 600 programmed to carry out the described and illustrated functions in the manner described here. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components (NFC, Bluetooth, and Wi-Fi) to provide communication via other modalities. The devices 670 may be another machine or any of a wide variety of peripheral devices (e.g., a peripheral device coupled via a universal serial bus (USB)).

Executable Instructions and Machine-Storage Medium

The various memories (e.g., 630, 632, 634, and/or memory of the processor(s) 610) and/or the storage unit 636 may store one or more sets of instructions and data structures (e.g., software) embodying or utilized by any one or more of the methodologies or functions described herein. These instructions, when executed by the processor(s) 610, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media", "computer-storage media," and "device-storage media" specifically exclude carrier waves, modulated data signals, and other such media, at least some of which are covered under the term "transmission medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer storage medium storing instructions, which when executed by the machine, cause the machine to perform operations comprising:
   accessing, from memory, data describing an integrated circuit design, the integrated circuit design comprising a connection path between two or more pins of a net, the connection path determined based on an initial routing of the net;
   identifying a portion of the connection path based on a minimum turn constraint, the minimum turn constraint specifying a number of turns, the portion of the connection path including the number of turns specified by the minimum turn constraint;
   detecting a zigzag in the portion of the connection path based on a local turn density constraint, the local turn density constraint specifying a ratio of a number of turns to a pathlength that corresponds to zigzagging in the net; and
   in response to detecting the zigzag in the portion of the connection path, removing the zigzag from the connection path by rerouting the net using a routing constraint that defines a maximum number of turns in the connection path.

2. The system of claim 1, wherein the detecting the zigzag in the portion of the connection path comprises:
   determining a local turn density in the portion of the connection path; and
   comparing the local turn density in the portion of the connection path with the local turn density constraint.

3. The system of claim 2, wherein determining the local turn density comprises:
   calculating a pathlength of the portion of the connection path; and
   dividing the number of turns by the pathlength of the portion of the connection path.

4. The system of claim 3, wherein the calculating the pathlength comprises:
   identifying turn locations in the portion of the connection path; and determining an aggregate of distances between the turn locations.

5. The system of claim 2, wherein the comparing the local turn density with the local turn density constraint comprises:
determining whether the local turn density exceeds a local turn density threshold.

6. The system of claim 1, wherein the operations further comprise:
identifying other portions of the connection path that include the number of turns specified by the minimum turn constraint; and
analyzing each of the other portions of the connection path to determine whether zigzagging is present.

7. The system of claim 1, wherein the removing of the zigzag comprises:
setting the routing constraint that defines a maximum number of turns in the connection path based on the minimum turn constraint.

8. The system of claim 7, wherein setting the routing constraint comprises:
determining a number of zigzagging portions in the connection path;
determining a number of non-zigzagging turns in the connection path; and
determining the maximum number of turns in the connection path based on a combination of the number of zigzagging portions, the number of non-zigzagging turns, and the minimum turn constraint.

9. The system of claim 1, wherein the operations further comprise:
receiving, from a user, the minimum turn constraint.

10. A method comprising:
accessing, from memory, data describing an integrated circuit design, the integrated circuit design comprising a connection path between two or more pins of a net, the connection path determined based on an initial routing of the net;
determining a local turn density in a portion of the connection path, the portion of the connection path comprising a number of turns specified by a minimum turn constraint;
detecting, by one or more hardware processors, a zigzag in the portion of the connection path based on the local turn density and a local turn density constraint, the local turn density constraint specifying a ratio of a number of turns to a pathlength that corresponds to zigzagging in the net;
in response to detecting the zigzag in the portion of the connection path, rerouting the net to remove the zigzag based on a routing constraint that defines a maximum number of turns in the connection path; and
generating a layout instance for the integrated circuit design based in part on the rerouting of the net, the layout instance describing physical layout dimensions of the integrated circuit design.

11. The method of claim 10, wherein the detecting the zigzag in the portion connection path comprises:
comparing the local turn density in the portion of the connection path with the local turn density constraint.

12. The method of claim 11, wherein the comparing the local turn density with the local turn density constraint comprises:
determining whether the local turn density exceeds a local turn density threshold.

13. The method of claim 10, further comprising:
identifying one or more portions of the connection path that include the number of turns specified by the minimum turn constraint; and
analyzing each of the one or more portions of the connection path to determine whether zigzagging is present.

14. The method of claim 10, further comprising:
setting the routing constraint that defines a maximum number of turns in the connection path based on the minimum turn constraint.

15. The method of claim 14, wherein setting the routing constraint comprises:
determining a number of zigzagging portions in the connection path;
determining a number of non-zigzagging turns in the connection path; and
determining the maximum number of turns in the connection path based on a combination of the number of zigzagging portions, the number of non-zigzagging turns, and the minimum turn constraint.

16. The method of claim 10, wherein determining the local turn density comprises:
calculating a pathlength of the portion of the connection path; and
dividing the number of turns by the pathlength of the portion of the connection path.

17. The method of claim 16, wherein calculating the pathlength comprises:
identifying turn locations in the portion of the connection path; and
determining an aggregate of distances between the turn locations.

18. The method of claim 10, further comprising receiving, from a user, the minimum turn constraint.

19. A computer storage medium storing instructions, which when executed by a machine, cause the machine to perform operations comprising:
accessing, from memory, data describing an integrated circuit design, the integrated circuit design comprising a connection path between two or more pins of a net, the connection path determined based on an initial routing of the net;
identifying a portion of the connection path based on a minimum turn constraint, the minimum turn constraint specifying a number of turns, the portion of the connection path including the number of turns specified by the minimum turn constraint;
detecting a zigzag in the portion of the connection path based on a local turn density of the portion of the connection path;
in response to detecting the zigzag in the portion of the connection path, rerouting the net to remove the zigzag based on a routing constraint that defines a maximum number of turns in the connection path; and
generating a layout instance for the integrated circuit design based in part on the rerouting of the net, the layout instance describing physical layout dimensions of the integrated circuit design.

20. The computer storage medium of claim 19, wherein:
the operations further comprise determining the local turn density in the portion of the connection path;
the determining of the local turn density comprises:
calculating a pathlength of the portion of the connection path; and
dividing the number of turns by the pathlength of the portion of the connection path; and the detecting the zigzag in the portion of the connection path comprises:
comparing the local turn density in the portion of the connection path with a local turn density constraint, the local turn density constraint specifying a ratio of a number of turns to a pathlength that corresponds to zigzagging in the net.

* * * * *